Feb. 25, 1941.  S. B. WINN  2,232,754
TRAILER
Filed Dec. 1, 1938  2 Sheets-Sheet 1
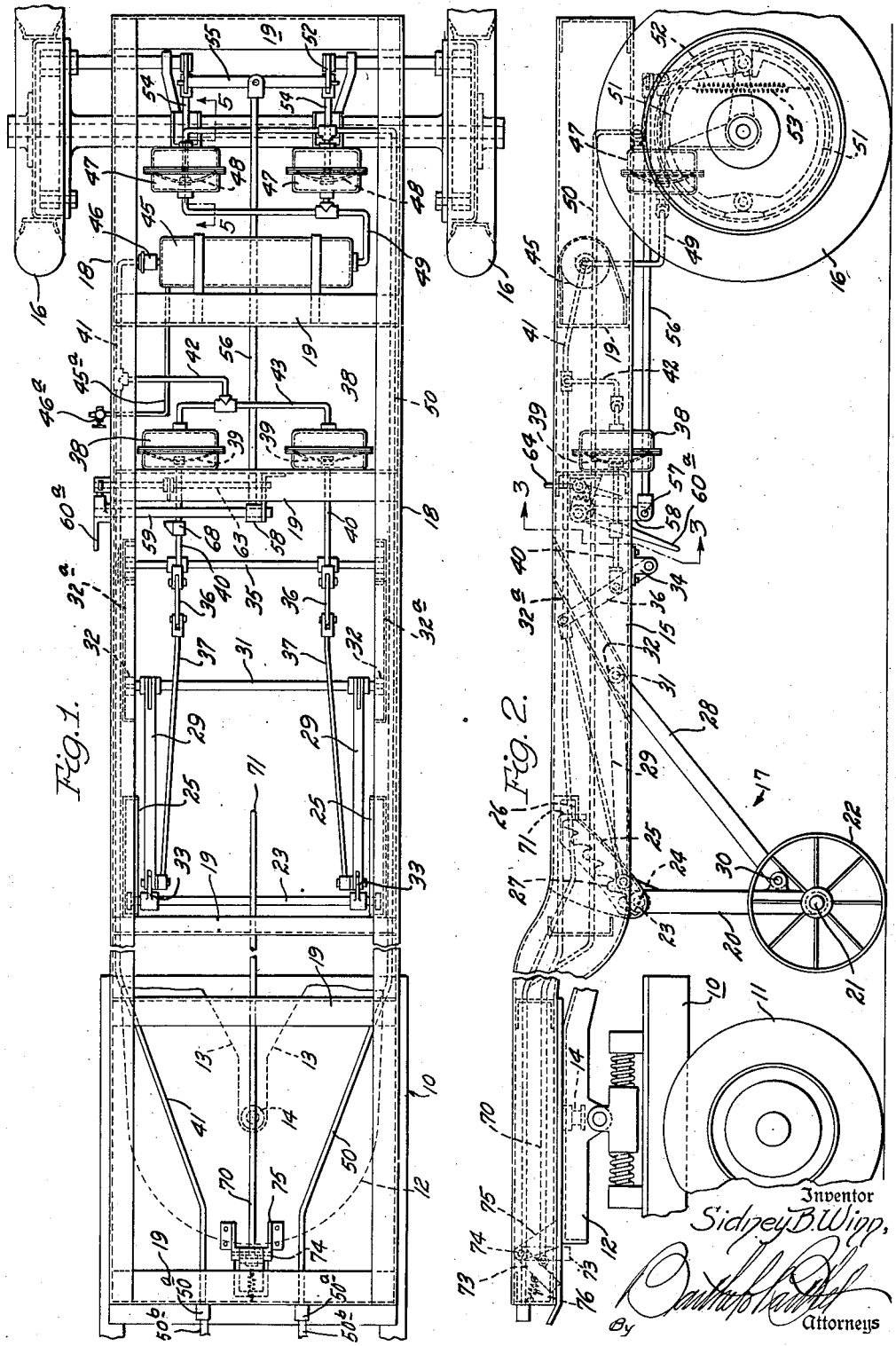

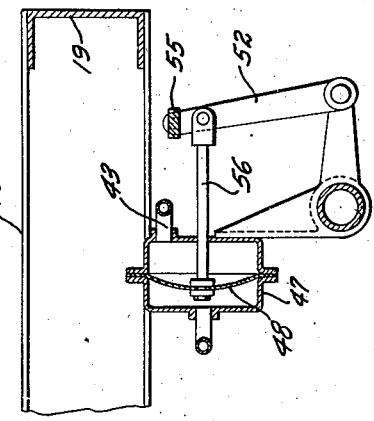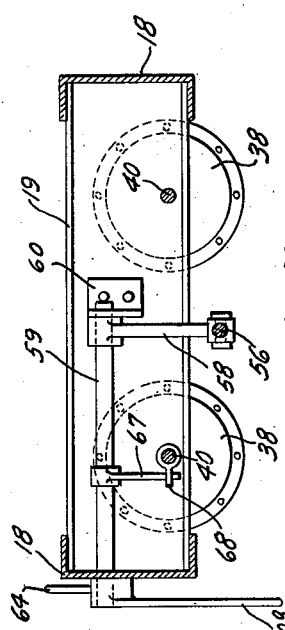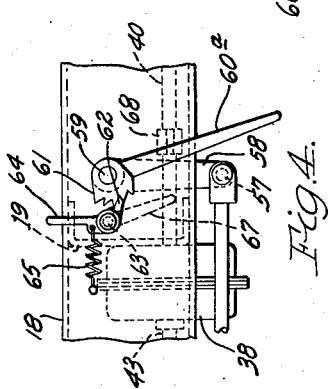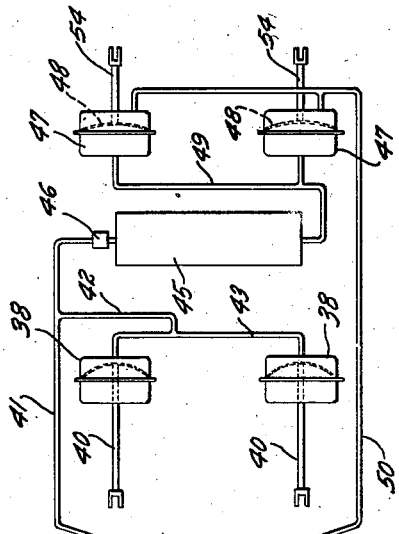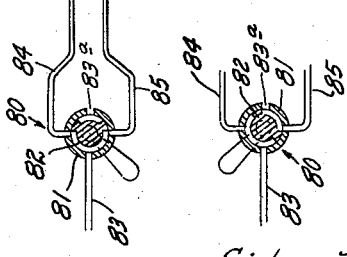

Patented Feb. 25, 1941

2,232,754

UNITED STATES PATENT OFFICE 2,232,754

TRAILER

Sidney B. Winn, Lapeer, Mich.

Application December 1, 1938, Serial No. 243,322

4 Claims. (Cl. 280—33.1)

This invention relates generally to tractor-trailer vehicles and more particularly to the trailer and control mechanism therefor.

One of the objects of the present invention is to provide a new and improved trailer of the type having a prop or so-called leg which may be raised and/or lowered.

Another object of the invention is to provide a new and improved operating mechanism for operating the trailer brakes and also for raising and/or lowering the trailer leg.

Another object of the invention is to provide a new and improved trailer having simple, efficient and dependable mechanism for raising and/or lowering the trailer leg and for operating the trailer brakes.

Other objects of the invention will become apparent from the following description taken in connection with the accompanying drawings in which—

Figure 1 is a top plan view of a rear end portion of a tractor and my improved trailer shown coupled to the tractor;

Fig. 2 is a side view in elevation of the tractor and trailer of Fig. 1;

Fig. 3 is a view shown partly in elevation and partly in cross section of the trailer, taken along the line and in the direction of the arrows 3—3 of Fig. 2;

Fig. 4 is a fragmentary view in elevation looking from left to right of Fig. 3;

Fig. 5 is a view in section of certain of the trailer brake operating mechanism, taken along the line and in the direction of the arrows 5—5 of Fig. 1;

Fig. 6 is a diagrammatical view of operating and control mechanism for operating parts of the tractor, and Fig. 7 is a diagrammatical view of the control shown in another position from the position shown in Fig. 6.

Referring to the drawings by characters of reference, the tractor includes the usual frame 10, mounted on wheels 11 and a so-called fifth wheel 12 pivotally mounted on the rear end of the tractor frame to support the front end of the trailer. The fifth wheel 12 may be of any suitable type and, in the present instance, is provided with coupling jaws 13 to receive a king pin 14, carried by the trailer, the king pin 14 and fifth wheel 12 being coupled together by releasable coupling mechanism which has been omitted from the drawings since such mechanism is well known in the art to which this invention appertains.

The trailer comprises in general a frame 15 mounted on rear wheels 16 and a so-called front supporting leg or prop, designated in general by the numeral 17, which leg is adapted to be raised clear of the ground when the vehicles are coupled for travel together. The frame 15 comprises spaced longitudinal frame members 18 rigidly secured together by transverse frame members 19, the frame having a raised front end portion which rests on the tractor fifth wheel.

Referring now more in detail to the leg structure 17 and its associated mechanism, this structure preferably includes a pair of spaced, substantially vertical leg members 20 mounted at their lower ends on a transverse shaft 21 which in turn is preferably mounted on wheels 22, and the upper ends of the spaced leg members 20 are joined by a transverse rod 23 on the outer ends of which are provided rollers 24 for cooperation with guide riser members 25, rigidly secured to and inwardly of the frame side members 18. These risers 25 are provided with upper, flat substantially horizontal supporting surfaces 26 on which the rollers 24 rest in the "up" or raised position of the leg or prop structure 17, and the risers are preferably further provided with spaced downwardly directed notches 27 along the riser portions or tracks for receiving the rod 23 in a lowered position of the prop structure. The legs 20 are braced against swinging movement about the axis of the rollers 24 by spaced angularly extending members 28 and spaced longitudinally extending members 29, which members are connected together and to the legs 20. The angularly disposed members 28 are connected at their lower ends, as at 30, to and adjacent the lower ends of the legs 20 and extending rearwardly and upwardly are preferably connected together at their upper ends by a transverse rod 31 on the outer ends of which rollers 32 are preferably provided and freeely received in channel-like riser guide members 32a which may be rigidly secured to and inwardly of the frame side members 18. Secured to the rod 23 is a pair of spaced, rearwardly and upwardly extending arms or levers 33 to which the forward ends of the connecting members 29 are connected, the rear ends of the connecting members 28 being connected to the transverse rod 31 which connects the upper ends of the angularly disposed members 28.

Rearwardly of the leg or prop structure 17, a pair of spaced brackets 34, rigidly secured to the underside of the frame members 18, support a transverse shaft 35 to which is secured a pair of spaced levers 36 which at their upper ends are pivotally connected to the forward ends of the connecting members 29 by links 37. To raise the leg or prop structure I provide power means which preferably include a pair of vacuum cylinders 38 which may be rigidly secured to one of the frame cross members 19 rearwardly of the levers 36. While I have shown two vacuum cylinders, one or more may be employed, depending upon the cylinder size and power required. In each of the vacuum cylinders 38, a pressure responsive movable means such as a diaphragm 39 is provided, the diaphragms being connected by links 40 to the levers 36 of the leg operating mechanism. A vacuum conduit or line 41 leads from the forward end of the trailer frame rearwardly along one of the side frame members 18 to which it may be suitably secured, and from this conduit 41, a branch conduit 42 connects to a conduit 43 which in turn connects to the vacuum cylinders 38 at the rear thereof. Rigidly secured to the intermediate cross member 19 immediately rearward of the vacuum cylinders 38 is a vacuum holdover tank 45 to which the vacuum line 41 connects via a check valve 46 which may be of any suitable type. This check valve 46 is located in line 41 between the leg lifting cylinders 38 and the vacuum tank 45 so as to hold the vacuum in tank 45 when the vacuum in cylinder 38 is released. A branch conduit 45a leading from the vacuum tank 45 is provided with a bleeder valve 46a for a purpose hereinafter fully described. Rearwardly of the vacuum tank 45 is a second pair of vacuum cylinders 47 each having therein a diaphragm 48 dividing their respective cylinders into a forward chamber and a rearward chamber, this second pair of vacuum cylinders forming in part brake operating mechanism for the trailer rear wheels 16. The forward chambers of the brake vacuum cylinders 47 are connected to the vacuum tank 45 by a conduit 49 and the other or rear chambers are connected to a conduit 50 which leads therefrom forwardly of the trailer and may be suitably secured to the frame side member 18 opposite from the side member to which the vacuum conduit 41 is secured. As will hereinafter be understood, more clearly, under certain operating conditions the conduit 50 is connected to a vacuum creating or suction source to obtain subatmospheric pressures in the rear chambers of the brake operating cylinders 48 and under other conditions the conduit 50 is open to atmosphere. Conduits 41 and 50 terminate in coupling members 50a to which flexible conduits 50b leading to the source of suction, such as, the intake of the tractor engine, and the coupling or uncoupling of the conduit 50b controls the prop raising vacuum cylinders 38.

The brakes of the trailer rear wheels 16 may be of any suitable type and each comprises in general, Fig. 2, a pair of brake shoes 51 operated by levers 52 against the action of springs 53, only one of which is shown. Connecting rods 54 individually connect the brake levers 52 to the cylinder diaphragms 48. Adjacent their upper ends, the brake operating levers 52 are provided with aligning apertures for rotatably receiving reduced end portions of a transverse connecting member 55 which operatively connects the opposite wheel brakes for operation together. A longitudinally extending connecting rod 56 is connected at one end thereof to and substantially midway of the ends of the transverse connecting member 55, the other or forward end of the connecting rod 56 being pivotally connected as at 57, Fig. 2, to the lower end of a lever 58 mounted on a transverse shaft 59 which is preferably positioned forward of the frame cross member 19 to which the vacuum cylinders 38 are secured. A bracket 60, Fig. 3, is rigidly secured to the trailer frame and is apertured to receive and support one end of the transverse shaft 59, the other end of the shaft 59 being supported in an aperture in one of the frame side members 18. This outer end of the transverse shaft 59 projects slightly outward from the frame and secured thereto is a manually operable lever 60a by means of which the trailer rear wheel brakes may be applied and/or released when parked, if desired. Rigid with the lever 60a, a ratchet 61 is arranged to cooperate with a pawl 62 secured to a shaft 63 which is adjacent and parallel to the shaft 59. The pawl, Fig. 4, is provided with an upwardly directed arm 64 to which one end of a spring 65 is secured, the other end of the spring being anchored to the adjacent side frame member 18. As shown, the spring 65 acts to hold the pawl 62 in cooperative engagement with the ratchet 61. Secured to the same shaft 63 to which the pawl 62 is secured, there is a lever having a downwardly directed arm 67 which serves as a trip operable to disengage the pawl from the ratchet. The trip arm 67 is arranged in the path of and for engagement and actuation by an abutment member 68 integral with one of the connecting rods 40 of one of the leg or prop lifting vacuum cylinders 38.

As previously mentioned, the supporting rollers 24 of leg or prop structure in raised position rest on the flat surfaces 26 of the riser members 25 and in order to insure lowering of the leg structure, a rod 70 extending longitudinally of the trailer is provided having at its rear end a hook portion 71 to engage the leg shaft 23 and pull the leg structure forward and off the flat supporting surfaces 26 permitting the leg structure to descend by gravity. The forward end of the rod 70 is pivotally connected to the upper end of a lever 73 pivoted on a transverse shaft 74 which is supported by a bracket 75 rigidly secured to the trailer adjacent the forward end thereof. A helical coil spring 76 acts on the lever 73 and is adapted to move the rod 70 forwardly to engage and move the leg structure forwardly off of its flat seating surfaces 26. The provision of lever 73 is a safety means to insure descent of the leg structure and in the raised position of the leg structure, lever 73 will depend below the under surface of the trailer as shown in dotted lines, Fig. 2. It will be seen that when the tractor draws away from the trailer on uncoupling the vehicles, the tractor fifth wheel 12 engages the lever 73, pulling rod 70 forward, thus causing the leg structure to be moved forward off of its flat seating surfaces prior to release of the forward end of the trailer by the tractor.

Referring now more particularly to Figs. 6 and 7, a control or valve 80 is diagrammatically illustrated and is adapted to control operation of the rear wheel trailer brakes. This control 80 may be suitably located in the cab of the tractor convenient to the operator and comprises in general a valve body 81 containing a manually operable rotatable valve 82. The valve body 81 is provided with an opening therein which is connected by a conduit 83 to a suitable source of suction, such as the intake manifold of the tractor engine, and the valve body 81 is provided with another opening or aperture 83a which is open to outside atmosphere. The present valve body is further provided with a pair of apertures leading thereinto to one of which the vacuum line 41 is connected by a conduit 84 and to the other of which the line 50 is connected by a conduit 85. The connecting conduits 84 and 85 are preferably flexible conduits, adapted to be readily disengaged from the main conduits 41, 50 of the trailer. As shown, in Fig. 6, the valve 82 is adapted in one position to establish communication between the suction source and both of the conduits 84, 85 leading to the vacuum cylinders 38, 47 and vacuum tank 45 and in another position the valve is adapted to interrupt communication between the source of vacuum and line 85 and opening line 85 to atmosphere while retaining communication between the source of suction and the other line 84.

In coupling the trailer to the tractor, the tractor is backed to the trailer, the front end of which slides up onto the tractor fifth wheel 12 and is coupled thereto by means including the king pin 14 which is received in the jaws 13 of the fifth wheel. The operator then connects the flexible conduits 84 and 85, carried by the tractor, to the conduits 41 and 50 carried by the trailer, and vacuum or subatmospheric pressure will be had in the rear chambers of the leg hoisting vacuum cylinders 38, in the vacuum tank 45, and on opposite sides of the diaphragms 48 of the brake cylinders 47. It will be seen that subatmospheric pressure will be had on both sides of the brake cylinder diaphragms 48 since the valve 82 is in position to establish communication between the source of suction and both of the main lines 41 and 50. Equalizing the pressure on both sides of the brake cylinder diaphragms 48 permits releasing of the trailer rear wheel brakes by the brake springs 53. When the line 41 is connected with the source of suction, the diaphragms of the vacuum cylinders 38 are flexed rearwardly and through links 40, levers 36 and rods 37 move the leg or prop structure upwardly and rearwardly clear of the ground. The leg or prop rollers 24 ride up the riser guide members 25 and seat on the upper flat supporting surfaces 26 thereof. In this raised position, the weight of the leg structure 17 is substantially entirely removed from the power means or vacuum cylinders which enhances retention of the vacuum, and further requires very little power to hold the leg from descending should there be some loss of power by the cylinders. As the leg structure is raised rod 23 engages the hook 71 of rod 70 and moves the rod rearwardly pivoting lever 73 to the position shown in dotted lines, Fig. 2. If the mechanical brake holding and releasing mechanisms, including the ratchet 61 and pawl 62 are set at the time of raising of the leg structure 17, the abutment members 68 carried by one of the cylinder diaphragm connecting rods 40 will engage and pivot lever 67 moving and holding the pawl 62 out of engagement with the ratchet 61, thus releasing the trailer rear wheel brakes. With the leg structure raised and the brakes released the tractor-trailer vehicle is ready to travel. During travel of the tractor-trailer, the valve 82 normally remains in the position shown in Fig. 6, in which position of the valve, subatmospheric pressure is maintained in the cylinders 38 to hold the leg up and in the tank 45 and on opposite sides of the diaphragms 48 of the brake cylinders 47 so that the brakes will be released. When it is desired to apply the brakes, the operator moves the control valve 82 to the position shown in Fig. 7, in which position the vacuum is maintained in the rear chamber of the leg holding cylinders 38 but opens the rear chambers of the brake cylinders 47 to outside atmosphere resulting in the setting of the trailer rear wheel brakes. When the trailer is to be uncoupled and parked, the flexible lines 84 and 85 are disconnected from lines 41 and 50 which breaks the vacuum in the vacuum cylinders 38, releasing the holding force on the raised leg structure and at the same time opens the rear chambers of the brake actuating cylinders 47 to atmosphere resulting in setting of the trailer brakes. The brakes are set when the rear chambers of the cylinders 47 are opened to atmosphere because, opening of line 41 does not break the vacuum in tank 45 by reason of the presence of the check valve 46. After uncoupling the tractor and trailer at the fifth wheel 12, the tractor may then pull away from the trailer and if the leg structure 17 has not already descended by gravity, the hooked end 71 of rod 70 will engage the transverse rod 23 and pull the leg structure 17 forward prior to complete removal of the fifth wheel from beneath the trailer and until the leg supporting rollers are off of the flat seating surfaces 26 of the risers 25, after which the leg will descend by gravity. Also upon descent of the leg structure 17, the abutment member 68 will move away from the arm 67, permitting the spring 65 to move the pawl 62 into engagement with the ratchet 61 which thus serves as a mechanical holding means for the trailer brakes in addition to the vacuum holding means. If it is desired to release the brakes, the vacuum may be released by means of the bleeder valve 46a at the tank 45 after which the brakes may be released by moving the pawl 62 out of engagement with the ratchet 61 by the manually operable lever 60a.

What I claim is:

1. In a trailer vehicle having a frame and having rear wheel brakes, a prop structure for the front end of the frame, said prop structure having a lowered position and a raised position, vacuum power means operable to actuate the brakes, a conduit connecting said power means with a suction source, a vacuum tank interposed in said conduit between said source and said power means, vacuum power means operable to raise said prop structure, a branch conduit connecting said second-named power means to said conduit between said source and said tank, means controlling flow through said conduit, and a check valve interposed in said first-named conduit between said branch conduit and said tank.

2. In a trailer vehicle having rear wheel brakes, a prop for the front end of the trailer, said prop having a lowered ground engaging position and having a raised position, vacuum power means operable to actuate the brakes, means connecting said power means to a source of suction, a vacuum tank connected to and between said source and said power means, vacuum power means operable to raise said prop and connected to and between said source and said tank, means controlling operation of said power means, and a check valve for said vacuum tank and disposed between said tank and said second-named vacuum power means.

3. In a tractor vehicle having rear wheel brakes, a prop for the front end of the trailer, said prop having a lowered position and a raised position, fluid power means operable to actuate said brakes and connected to a source of suction, a fluid tank disposed between and connected to said source and to said power means, power means operable to raise said prop and connected to said source and to said tank, means controlling said first-named power means and said second-named power means, and a check valve for said tank and disposed between said second-named power means and said tank.

4. In a trailer vehicle having rear wheel brakes, a prop for the trailer, said prop having a lowered position and a raised position, fluid pressure power means operable to actuate the brakes, conduit means connecting said power means to a source of suction, a fluid tank interposed in said conduit means between said source and said power means, fluid pressure power means operable to raise said prop, conduit means connecting said second-named power means to said first-named conduit means between said source and said tank, means controlling flow through said conduit means, and pressure responsive valve means in said first-named conduit means between said second-named conduit means and said tank.

SIDNEY B. WINN.